US006745299B2

United States Patent
Bushey et al.

(10) Patent No.: US 6,745,299 B2
(45) Date of Patent: Jun. 1, 2004

(54) METHOD FOR EVALUATION OF SCALABLE SYMMETRIC MULTIPLE PROCESSOR CACHE COHERENCY PROTOCOLS AND ALGORITHMS

(75) Inventors: Robert D. Bushey, San Diego, CA (US); Kelly Larson, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 248 days.

(21) Appl. No.: 09/988,121

(22) Filed: Nov. 19, 2001

(65) Prior Publication Data

US 2003/0097527 A1 May 22, 2003

(51) Int. Cl.⁷ .................................................. G06F 12/00
(52) U.S. Cl. ........................ 711/146; 711/130; 711/154; 711/219; 709/217
(58) Field of Search ................................. 711/119, 141, 711/156, 219, 124, 130, 146; 709/217, 213

(56) References Cited

U.S. PATENT DOCUMENTS

| | | | | | |
|---|---|---|---|---|---|
| 5,317,738 | A | * | 5/1994 | Cochcroft et al. | 718/103 |
| 5,974,438 | A | * | 10/1999 | Neufeld | 718/104 |
| 6,507,880 | B1 | * | 1/2003 | Arimilli et al. | 710/107 |
| 6,601,144 | B1 | * | 7/2003 | Arimilli et al. | 711/146 |
| 6,631,450 | B1 | * | 10/2003 | Arimilli et al. | 711/146 |
| 6,704,843 | B1 | * | 3/2004 | Arimilli et al. | 711/146 |
| 2003/0097527 | A1 | * | 5/2003 | Bushey et al. | 711/119 |

* cited by examiner

*Primary Examiner*—Donald Sparks
*Assistant Examiner*—Brian R. Peugh

(57) ABSTRACT

A system and method of evaluating cache coherency protocols and algorithms in scalable symmetric multiple processor computer systems. The system includes scalable 32-byte or larger cache lines wherein one specific byte in the cache line is assigned for write and read transactions for each specific 32-bit processor. The method includes steps to ensure each 32-bit processor writes and reads to and from the specific byte in the cache line assigned to that 32-bit processor.

7 Claims, 6 Drawing Sheets

METHOD FOR EVALUATION OF SCALABLE SYMMETRIC MULTIPLE PROCESSOR CACHE COHERENCY PROTOCOLS AND ALGORITHMS

TECHNICAL FIELD

The technical field relates to multiple processor computer system designs. More particularly, the technical field relates to systems and methods of evaluating scalable symmetric multiple processor cache coherency protocols and algorithms.

BACKGROUND

Managing memory and memory cache units is a critical aspect of the design, development and testing of multiple processor computer systems, particularly with the growing number of processors and system buses implemented in existing and planned scalable symmetric multiple processor systems. The coherency of cache memories utilized by each of the processors and the system as a whole is a critical performance and accuracy issue.

Several approaches have been taken in the prior art in attempting to evaluate cache coherency. Two of the more prominent are formal verification and system-wide simulation based evaluation.

Formal verification involves the creation of mathematical models to represent the cache coherency protocol. Formal verification becomes very complex as the coherency scheme scales up and becomes complex itself. It is in fact quite difficult, if not impossible, to apply formal verification to modern, highly scaled and complex symmetric multiprocessing systems. Additionally, formal verification can not be applied during production for final product testing and evaluation.

System-wide simulation based evaluation requires detailed cycle by cycle timing of events across an entire system. Coherency schemes often involve complicated rules which govern the ownership of a given global cache line. Adding to the complexity is the phased nature of modem processor buses. It becomes very tricky to track the phase of every transaction on every bus in the entire symmetric multiprocessing system. Systems can have 10 or more buses and 16 or more processors with outstanding transactions. The intrinsic complexity of this approach prohibits its use during production or final product testing and evaluation as in the formal verification approach.

What is needed is a computationally efficient method and system for implementing and evaluating scalable symmetric multiple processor cache coherency protocols and algorithms.

SUMMARY

In one respect, what is described is a system for evaluating scalable symmetric multiple processor cache coherency protocols and algorithms. The system includes a scalable symmetric multiple processor computer system, wherein the scalable symmetric multiple processor computer system includes a central electronics complex (CEC), one or more first buses connected to the CEC, one or more first processor slots connected to the one or more first buses, and a memory. The system also includes an application specific integrated circuit (ASIC) replacing the processor in each of the one or more first processor slots of the scalable symmetric multiple processor computer system; a first memory cache unit associated with each ASIC; one or more second buses connected to each ASIC; one or more second processors connected to each second bus; and a second memory cache unit associated with each second processor. The memory, the first memory cache unit, and the second memory cache unit each comprise one or more multiple-byte cache lines wherein one byte of each the multiple-byte cache lines is reserved for access by one of the one or more second processors.

In another respect, what is described is a method for evaluating scalable symmetric multiple processor cache coherency protocols and algorithms. The method includes the steps of setting up an initial state of a scalable symmetric multiple processor computer system, initializing all data structures of the scalable symmetric multiple processor computer system beyond the initial state, tracking write and read transactions issued to memory cache lines, and comparing a listing of the initial state against a listing of a state resulting from the write and read transactions. The method includes further steps to ensure each second processor writes and reads to and from the specific byte address in the cache line assigned to that second processor, and that data read in a read transaction from a specific byte address corresponds to any data previously written to that same byte address.

In yet another respect, what is described is a computer-readable medium on which is embedded a program. The embedded program includes instructions for executing the above method.

Those skilled in the art will appreciate these and other advantages and benefits of various embodiments of the invention upon reading the following detailed description of an embodiment with reference to the below-listed drawings.

DESCRIPTION OF THE DRAWINGS

The detailed description will refer to the following drawings, wherein like numerals refer to like elements, and wherein.

DETAILED DESCRIPTION

Figure 1:
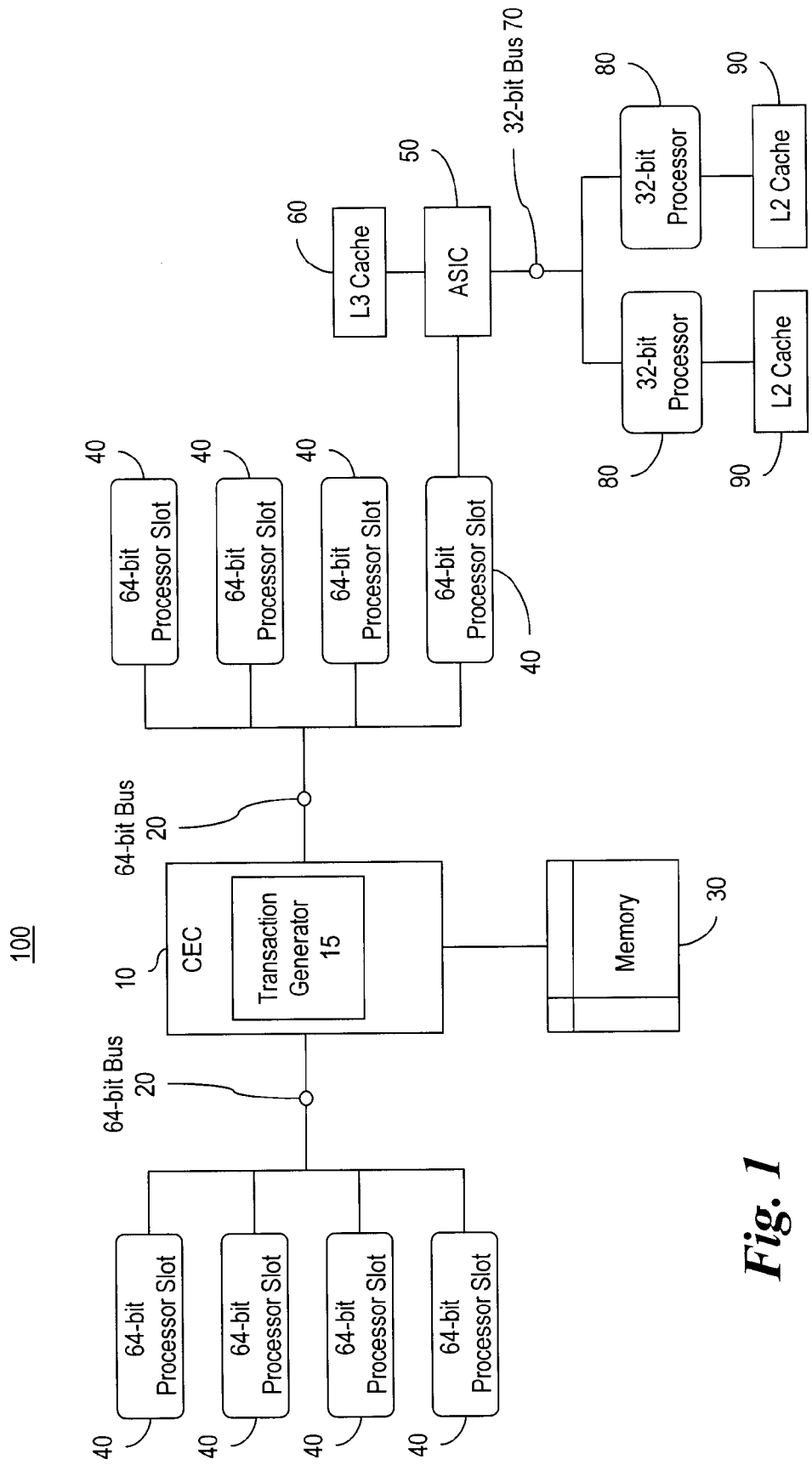
FIG. 1 shows exemplary embodiment of a symmetric multiple processor system in which a system and method for evaluating and implementing cache coherency protocols and algorithms in scalable symmetric multiple processor computer systems may be implemented.

FIG. 1 shows a symmetric multiple processor system 100 in which one embodiment of a system for evaluating and implementing cache coherency protocols and algorithms in scalable symmetric multiple processor computer systems may be implemented. The multiple processor system 100 includes a central electronics complex ("CEC") 10, one or more 64-bit buses 20, such as Intel Architecture-64 ("IA64") buses, a memory 30, and one or more 64-bit processor slots 40 connected to each of the one or more 64-bit buses 20. In an embodiment of the invention used for emulation and testing, the CEC 10 may include a transaction generator 15 that generates pseudo-random memory read and write transactions.

In a preferred embodiment of the system 100 of the invention, there may be included two 64-bit buses and eight 64-bit processor slots 40, four 64-bit processor slots 40 connected to each of the two 64-bit buses 20. The present invention is scalable in that there may be any number of 64-bit buses 20 and any number of 64-bit processor slots. Although the preferred embodiment of the system 100 according to the invention may use Intel Architecture-64 ("IA64") buses and IA64 processor slots intended for IA64 processors, any type of main system bus or any architecture processors may be substituted for the Intel architecture-based units described herein.

One embodiment of the system 100 further includes an application specific integrated circuit ("ASIC") 50 connected to each of the 64-bit processor slots 40 in the place of an expected 64-bit processor (not shown). The ASIC 50 is further connected to a L3 cache memory unit 60 and a 32-bit bus 70, such as an Intel Architecture-32 ("IA32") bus. The ASIC 50 functions to permit replacement of 64-bit processors in the 64-bit processor slots 40 with multiple 32-bit processors 80. FIG. 1 shows two 32-bit processors 80 connected to the 32-bit bus 70, and one L2 cache memory unit 90 connected to each 32-bit processor 80. Alternate embodiments of the system 100 may include more than one 32-bit bus 70 connected to each ASIC 50, and more than two combinations of 32-bit processors 80 and L2 cache units 90 connected to each 32-bit bus 70. As with the 64-bit buses 20 and 64-bit processor slots 40 described above, in alternate embodiments of the system 100 any type of processor bus or any architecture processors may be substituted for the Intel architecture-based units described herein. Similarly, although the preferred embodiment of the system 100 includes 64-bit first buses 20 and 32-bit second buses 70, alternate embodiments may utilize first buses 20 of any bit width greater than or equal to 32 bits, and may utilize second buses 70 of any bit width less than the bit width of the first buses 20. Likewise, although the preferred embodiment of the system 100 includes 64-bit processor slots 40 and 32-bit processors 80, alternate embodiments may utilize a processor slot 40 having any bit width matching that of the first buses 20, and include processors 80 having any bit widths matching that of the second buses 70.

Figure 2:
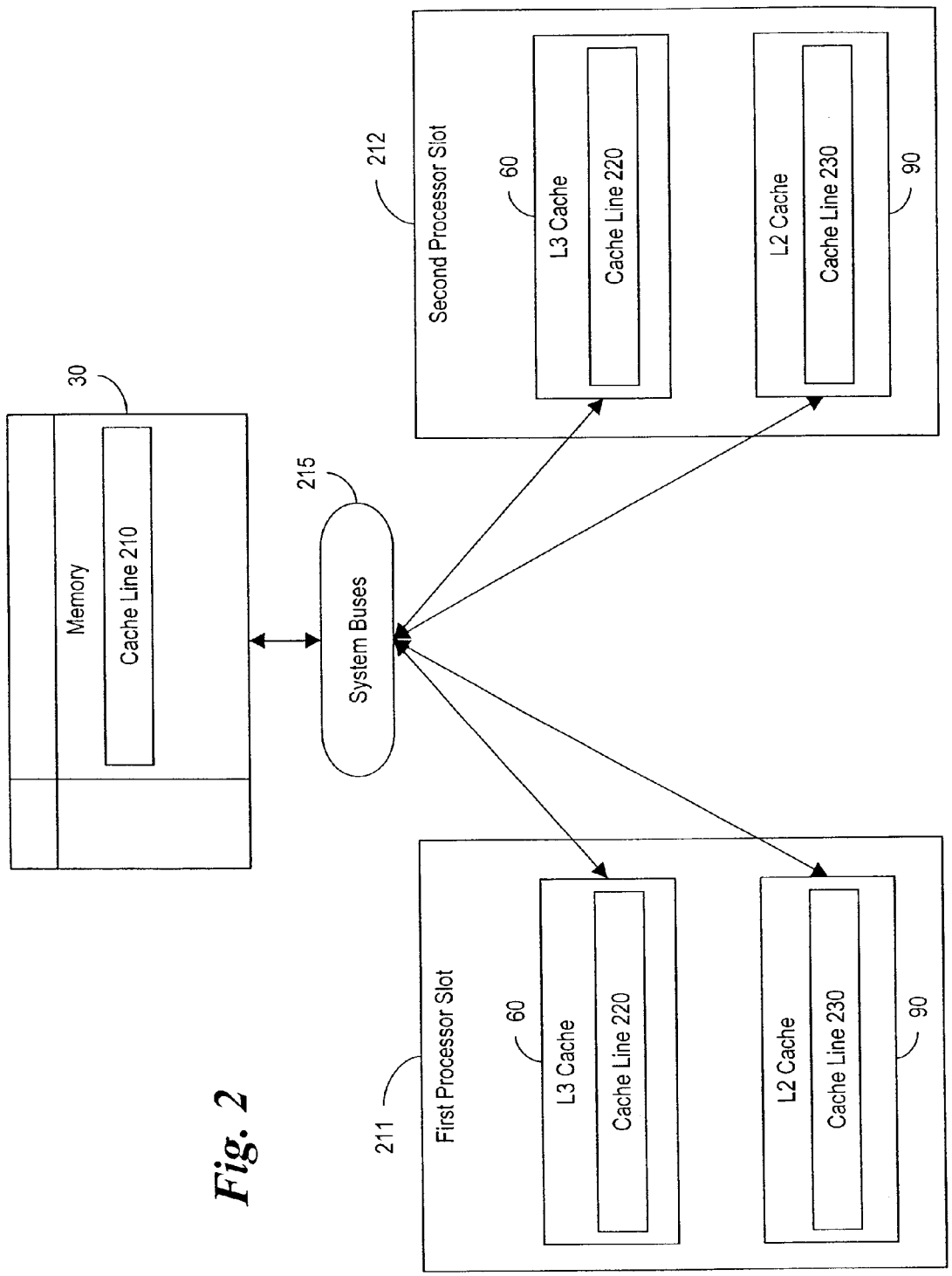
FIG. 2 illustrates interaction cache lines managed by the memory and cache memory units of FIG. 1.

FIG. 2 illustrates the memory 30 and the cache memory units 60 and 90, and the interaction across the system 100 of cache lines managed by each unit. The CEC 10, 64-bit buses 20, ASIC 50, and 32-bit buses 70 are represented in FIG. 2 by the box labeled system buses 215. Connected to the system buses 215 are the memory 30 and two representative 64-bit processor slots 40, designated in FIG. 2 as first processor slot 211 and second processor slot 212. Each of the first processor slot 211 and the second processor slot 212 are shown including the L3 memory cache unit 60 and one or more L2 memory cache units 90. The memory 30 is shown further comprising one or more physical locations storing cache lines 210. The L3 memory cache units 60 are likewise shown comprising one or more physical locations storing cache lines 220, and the L2 memory cache units 90 are also shown comprising one or more physical locations storing cache lines 230.

In a complex multiple processor system such as the one shown in FIG. 1 and FIG. 2, it is necessary for each individual processor's memory cache unit, such as the L2 memory cache unit 90, to synchronize with the contents of the main memory 30. Each L2 cache 90 may read the cache line 210 from the memory 30 into the cache line 230 in the L2 cache itself. Similarly, each L3 cache 60 may read the cache line 210 from the memory 30 into the cache line 220.

The L2 cache 90 may also write changes to the data in the cache lines 230 and then write the cache lines 230 into the cache line 210 in the memory 30. Again, each L3 cache 60 may also write changes to the data in the cache line 220, and then write the cache line 220 to the cache line 210 in the memory 30. As stated above, it is crucial to the operation of such a multiple processor system that the state of the cache lines 210, 220, 230 be coherent at all times. When the data in the cache line 230 from one L2 cache 90 associated with one of the 32-bit processors 80 is written to the cache line 210 in the memory 30, the new data then in the cache line 210 should not be overwritten by incorrect or stale data in the cache line 230 from a different L2 cache 90 or L3 cache 60 associated with a different 32-bit processor 80.

Figure 3A:
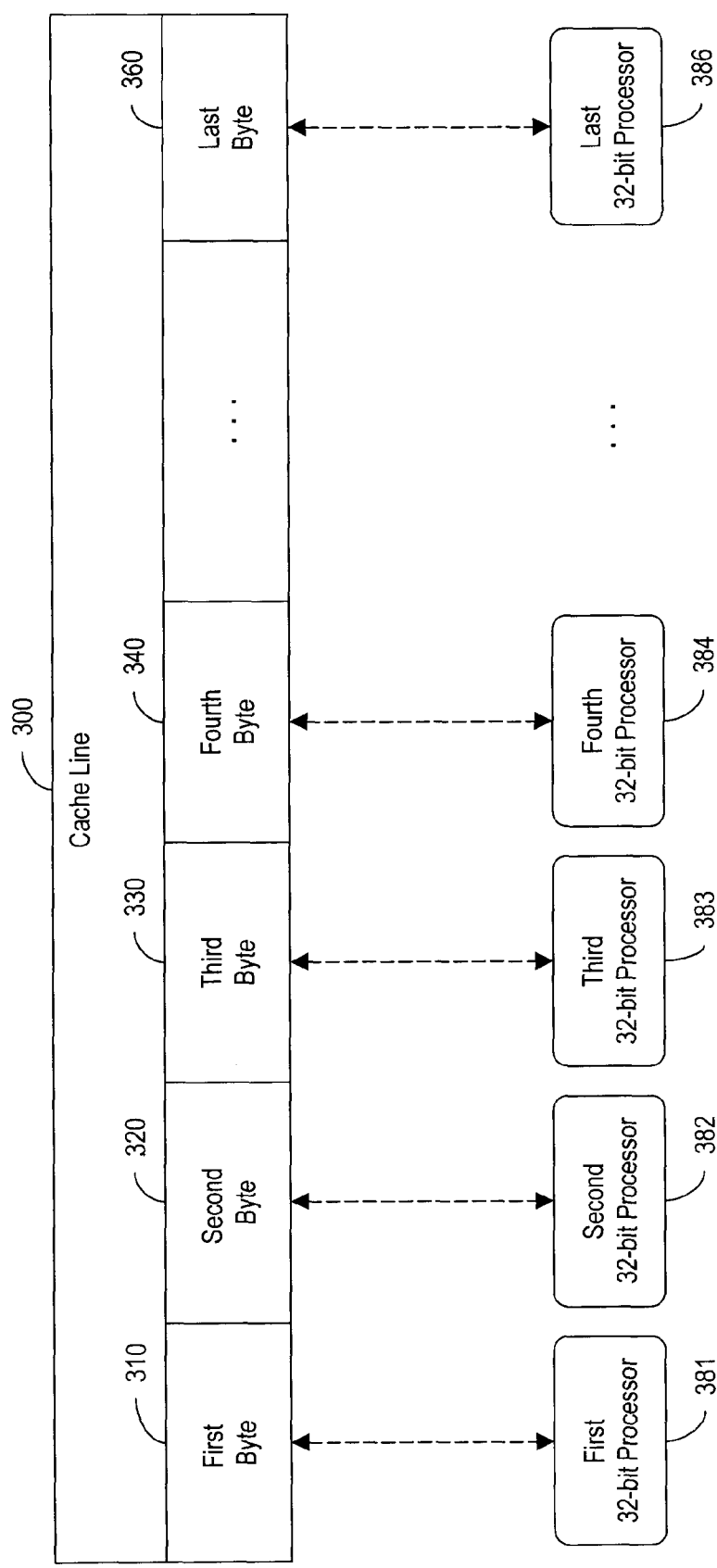
FIG. 3a is a diagram of one embodiment of a cache line from FIG. 2.

FIG. 3a illustrates the structure of a cache line 300 according to one embodiment of a system for evaluating scalable symmetric multiple processor cache coherency protocols and algorithms. In this embodiment, the cache line 300 may be any one of the cache lines 210, 220, or 230 shown in FIG. 2. Each cache line 210, 220, 230 will have identical formatting so that one cache line may be written into any other cache line under the control of the CEC 10. Also shown in FIG. 3a are the individual 32-bit processors 381, 382, 383, 384, and 386, representing one each of the 32-bit processors 80, connected to the system 100 of FIG. 1.

The cache line 300 of this embodiment is further subdivided into several bytes (310, 320, 330, 340, 360) of data, a byte representing a unit of 8 bits of digital data. In a preferred embodiment of the invention, the cache line 300 comprises a 32-bit cache line consisting of thirty-two bytes. According to the preferred embodiment of the invention, one specific byte from the thirty-two bytes will be reserved for each of the multiple 32-bit processors 80 in the system 100. In this manner, the first byte 310 may be assigned to the first 32-bit processor 381, the second byte 320 may be assigned to the second 32-bit processor 382, the third byte may be assigned to the third 32-bit processor 383, and so forth until the sixteenth, or last, byte 360 may be assigned to the last 32-bit processor 386. The protocol implemented by the present invention will then permit only the specific 32-bit processor 381, 382, 383, 384, or 386, and its associated L2 cache 90, assigned to a specific byte 310, 320, 330, 340, or 360 in the cache line 300 to write to that specific byte 310, 320, 330, 340, or 360. When a 32-bit processor 381, 382, 383, 384, or 386 writes data to its assigned byte 310, 320, 330, 340, or 360 in the cache line 300, it will then expect to receive that same data back when it next reads the cache line 300. This serves to help prevent the multiple 32-bit processors 381, 382, 383, 384, or 386 from overwriting data expected by the other 32-bit processors 381, 382, 383, 384, or 386. By constraining each processor to a single byte within a cache line 300, write transactions are accomplished through a read-modify-write process within each processor 381, 382, 383, 384, or 386. The system 100 can thus detect if write transactions to the same cache line 300 from different processors 381, 382, 383, 384, or 386 occur in order, and that cache coherence protocols are enforced across the system 100.

Figure 3B:
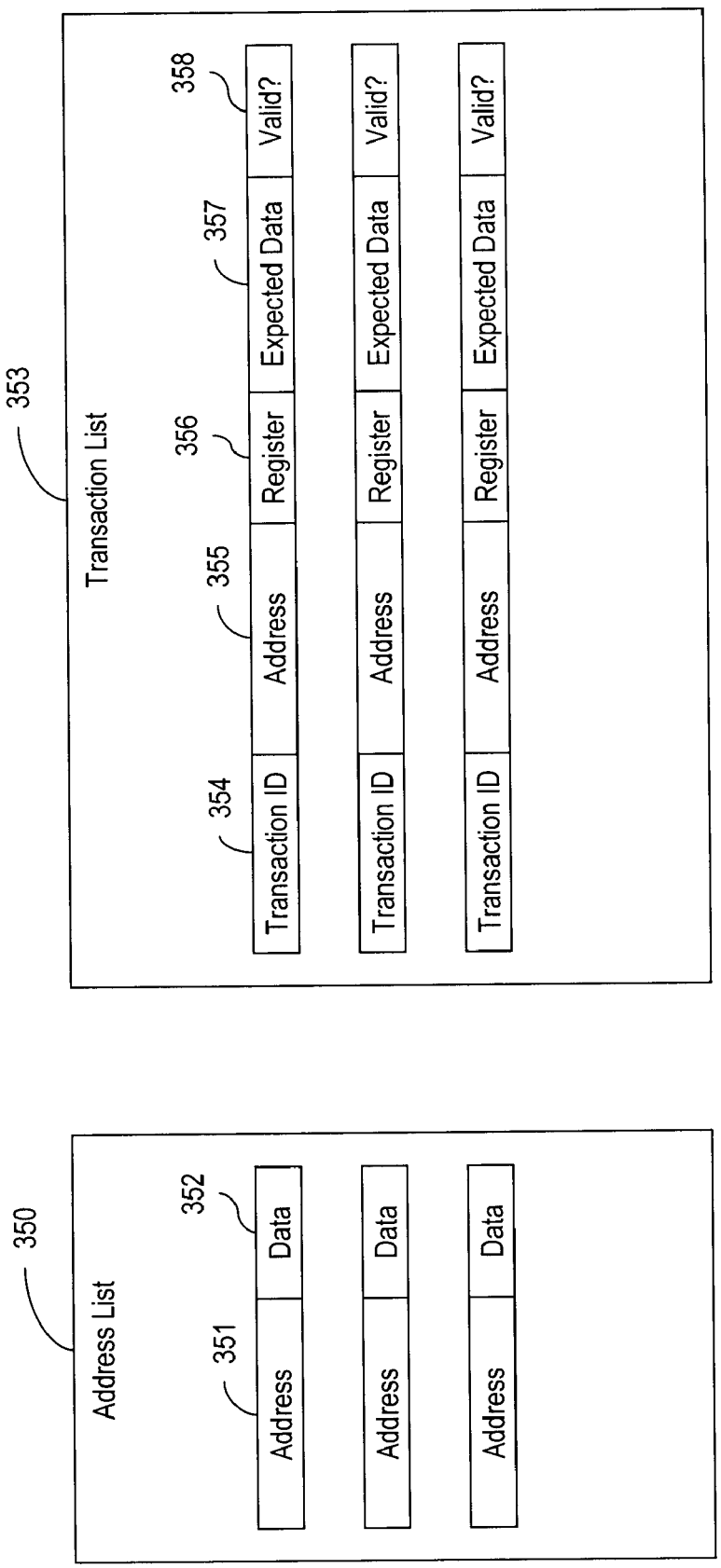
FIG. 3b shows an address list and transaction list used by a method of another embodiment of the invention.

FIG. 3b illustrates two queues 350, 353 set up for each of the possible 32-bit processors 80 within the scalable symmetric multiprocessor system 100 in order to implement the coherency evaluation method. These queues are an address list 350 and a transaction list 353. Both the address list 350 and the transaction list 353 may be implemented as an array of linked lists. The address list 350 includes an array of items, each item comprising an address 351 and data 352. The transaction list 353 includes an array of items, each item comprising a transaction identifier ("transaction ID") 354, an address 355, a register 356, expected data 357, and a valid flag 358 for indicating whether the transaction produced a valid result.

To implement the coherency evaluation method within a multiple processor system environment, such as the system 100, the behavior for all reads and writes issued during the evaluation needs to be altered. While applying the method, both the address 351 and data 352 of read and write transactions are altered as they are received from the transaction generator 15, and passed on to emulated or actual 32-bit processors 80.

When a write transaction is issued from the transaction generator 15 to one of the emulated or actual 32-bit processor 80, the address 351 is aligned to a cache line boundary associated with the cache line 300 being accessed by the 32-bit processor 80, if the address 351 is not already aligned. The address 351 is then offset by a value unique to the particular emulated or actual 32-bit processor 80 handling the write transaction. If data 352 is supplied from the transaction generator 15 for a write transaction, the data 352 that is written is a byte of data located at a specified offset number of bytes distant from the low order byte. The offset value applied for each byte of data is the same offset value used for the corresponding address offset calculation above. Only one byte of the data 351 is written. Any other bytes of data may be ignored.

An alternate embodiment of the method for selecting data to be written would be to use a globally incrementing one-byte counter that starts at zero and rolls over at 255. This counter could be global to the system 100, providing further sequencing information at the end of a simulation. A one-byte write is then issued to the processor 80 with the specified byte of data 351. No matter the length of the write transaction specified by the generator 15, the length of the write actually handed to processor 80 will be a one byte write.

For a read transaction, once again the address 351 is cache aligned, and then offset in accordance with the offset value as described above. No matter what length of read transaction is passed in from the transaction generator 15, a one byte read at the derived address is what will be issued to the processor 80.

Conceptually, by altering the read and write transactions in this way, the method simply allows a processor 80 to only read and write from its assigned byte within each 32-byte cache line. When it is a read transaction, the data 352 returned is checked to determine if it matches the expected data 357 recorded for that transaction ID 354. There is only valid expected data 357 if a write to that address 351 and 355 was previously performed, or if data has been seeded at the beginning of a simulation or startup of the system 100. If there is no valid expected data 357 for this transaction, the data returned is ignored. If there is valid expected data 357, due to a previous write or seeded value to this location, that expected data 357 is compared to the data 352 actually returned, and an error is generated if the returned data 352 does not match the expected data 357.

Figure 4:
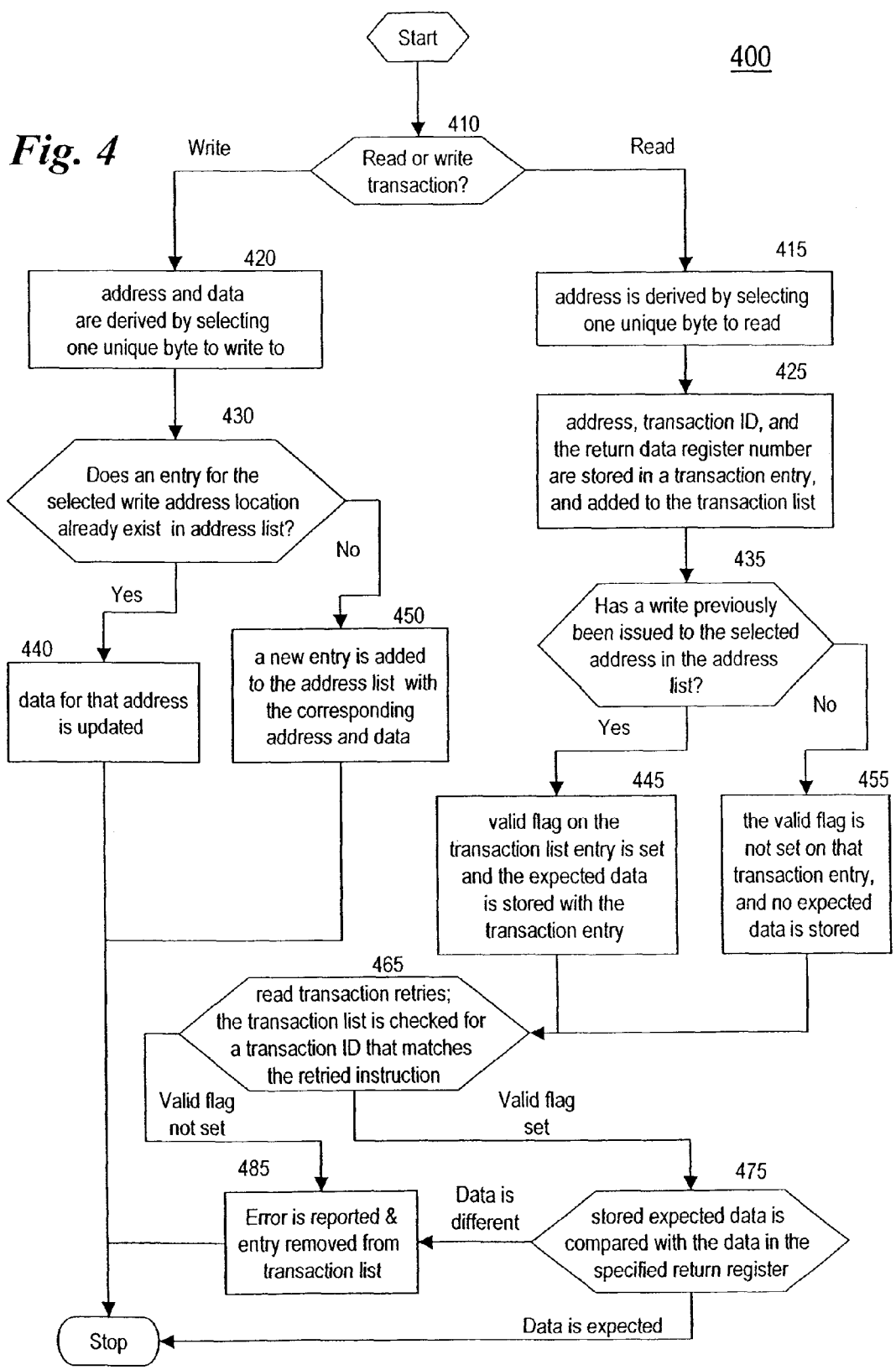
FIG. 4 is a flowchart of a method according to one embodiment of the invention.

FIG. 4 is a flowchart of the steps of a method 400 of the invention employed for managing the address list 350 and transaction list 353. The method 400 first determines whether the transaction issued by the transaction generator 15 is a write transaction or a read transaction (step 410). Then, if a write transaction is issued from the transaction generator 15 to an emulated or actual 32-bit processor 80, the address 351 and data 352 are derived as described above (step 420). The address list 350 for the emulated or actual 32-bit processor 80 is then checked to see if an entry for that address location already exists (step 430). If it does, the data for that address is updated (step 440). If it does not, a new entry is added to the list with the corresponding address and data (step 450).

If a read transaction is issued from the transaction generator 15 to an emulated or actual 32-bit processor 80, the address is derived as described above (step 415). The address 355, transaction ID 354, and the return data register number 356 are stored in a transaction entry, and added to the transaction list (step 425). The address list is then checked, to see if a write has previously been issued to that address (step 435). If so, a valid flag on the transaction list entry is set, and the expected data is stored with the transaction entry as well (step 445). If the same address is not found in the address list 350, the valid flag is not set on that transaction entry, and no expected data is stored (step 455).

Additionally, when a read transaction retries, the transaction list 353 is checked for a transaction ID 354 that matches the retried instruction (step 465). If the valid flag is set on this entry, the stored expected data is compared with the data in the specified I/O return register (step 475). If this data is different, an error is reported and this entry is then removed from the transaction list 353 (step 485).

Figure 5:
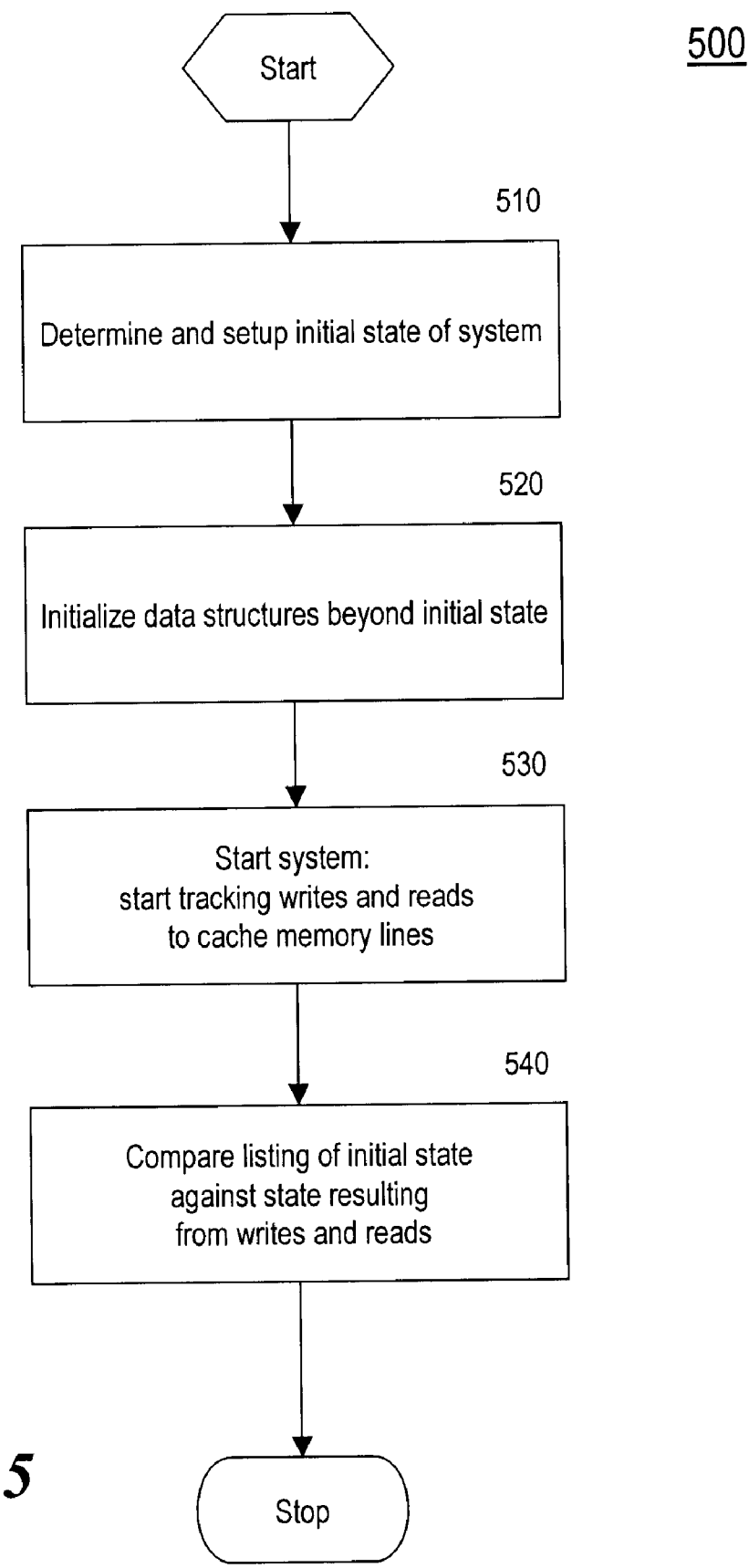
FIG. 5 is a flowchart of additional steps of the method according to the embodiment of FIG. 4.

The protocol and method 400 is implemented in the system 100 with the cache line structure 300 by means of a further method 500 as shown in FIG. 5. The method 500 begins with the establishment of the initial system state (step 510). Additional steps in the method 500 include initializing the data structures of the system beyond the initial state (step 520); starting up the system by beginning the writes and reads to and from memory cache lines and tracking those writes and reads by implementing the steps of the method 400 (step 530); and comparing a listing of the initial state of the system against a state resulting from a series of writes and reads (step 540).

By applying the methods 400 and 500 above, it becomes very straightforward to evaluate new coherency protocols and algorithms at any stage of product development and production. More importantly the system and methods described scale easily. One could readily conceive of applying this method to a computer system with 256+ processors and 40+ buses. These methods can be easily applied as a self test mode during production of final silicon and systems. Ultimately the goal of a coherency protocol and/or algorithm is to ensure a common view of a global memory. This implies that when a processor writes a partial line to memory it expects to read back what was written (assuming coherency correctness).

The steps of the methods 400 and 500 may be implemented with hardware or by execution of programs, modules or scripts. The programs, modules or scripts may be stored or embodied on one or more computer readable mediums in a variety of formats, including source code, object code or executable code, among other formats. The computer readable mediums may include, for example, both storage devices and signals. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the described methods can be configured to access, including signals downloaded through the Internet or other networks.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A method for evaluating scalable symmetric multiple processor cache coherency protocols and algorithms, the method comprising:

assigning a unique byte address in a multiple-byte cache line to each processor operating in a scalable symmetric multiple processor computer system; and tracking write and read transactions issued to memory cache lines.

2. The method of claim 1, wherein the tracking step further comprises:

determining if a memory cache transaction is a write or read transaction;

deriving an address of a write transaction;

checking if a data entry in an address list exists for the address of the write transaction;

updating the data entry in the address list if the data entry exists for the address of the write transaction; and adding a new data entry in the address list comprising the address and data of the write transaction.

3. The method of claim 1, wherein the tracking step further comprises:

determining if a memory cache transaction is a write or read transaction;

deriving an address of a read transaction;

storing the address, a transaction identifier, and a return register for the read transaction in a data entry in a transaction list;

checking an address list to determine if a write transaction has been previously executed on the address of the read transaction;

setting a valid flag in a data entry in the transaction list corresponding to the read transaction if a write transaction has been previously executed on the address of the read transaction; and storing data from a previous write transaction into the data entry in the transaction list corresponding to the read transaction if a write transaction has been previously executed on the address of the read transaction.

4. The method of claim 3, wherein the method further comprises steps for:

checking the transaction list for the transaction identifier of a read transaction being retired;

comparing the data from the previous write transaction with the data stored in a return register specified in the transaction list data entry for that read transaction; and reporting an error if the data from the previous write transaction differs from the data in the return register specified in the transaction list data entry for that read transaction.

5. A computer readable medium upon which is embedded instructions for carrying out a method for evaluating scalable symmetric multiple processor cache coherency protocols and algorithms, the instructions comprising:

assigning a unique byte address in a multiple-byte cache line to each processor operating in a scalable symmetric multiple processor computer system; and tracking write and read transactions issued to memory cache lines.

6. The computer readable medium of claim 5, wherein the tracking step further comprises:

determining if a memory cache transaction is a write or read transaction;

deriving an address of a write transaction;

checking if a data entry in an address list exists for the address of the write transaction;

updating the data entry in the address list if the data entry exists for the address of the write transaction; and adding a new data entry in the address list comprising the address and data of the write transaction.

7. The computer readable medium of claim 5, wherein the tracking step further comprises:

determining if a memory cache transaction is a write or read transaction;

deriving an address of a read transaction;

storing the address, a transaction identifier, and a return register for the read transaction in a data entry in a transaction list;

checking an address list to determine if a write transaction has been previously executed on the address of the read transaction;

setting a valid flag in a data entry in the transaction list corresponding to the read transaction if a write transaction has been previously executed on the address of the read transaction;

storing data from a previous write transaction into the data entry in the transaction list corresponding to the read transaction if a write transaction has been previously executed on the address of the read transaction;

checking the transaction list for the transaction identifier of a read transaction being retired;

comparing the data from the previous write transaction with the data stored in a return register specified in the transaction list data entry for that read transaction; and reporting an error if the data from the previous write transaction differs from the data in the return register specified in the transaction list data entry for that read transaction.

* * * * *